United States Patent Office 3,555,055
Patented Jan. 12, 1971

3,555,055
N-ALKOXY SULFANILAMIDES
Ephraim H. Kaplan, Skokie, Ill., assignor to Velsicol
Chemical Corporation, Chicago, Ill., a corporation of
Delaware
No Drawing. Filed Feb. 9, 1968, Ser. No. 704,219
Int. Cl. C07c 143/80
U.S. Cl. 260—397.7    6 Claims

ABSTRACT OF THE DISCLOSURE

New compounds of the formula

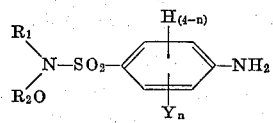

wherein $R_1$ is selected from the group consisting of alkyl, alkenyl and haloalkyl; $R_2$ is alkyl; Y is selected from the group consisting of halogen, alkyl and haloalkyl; and $n$ is an integer from 0 to 2. These compounds are useful as fungicides and as intermediates in the preparation of urea compounds useful as herbicides.

---

This invention relates to new compositions of matter and more particularly relates to new compounds of the formula

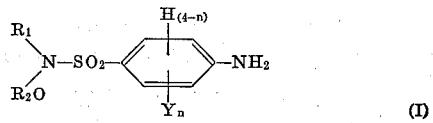

wherein $R_1$ is selected from the group consisting of alkyl, alkenyl, and haloalkyl; $R_2$ is alkyl; Y is selected from the group consisting of halogen, alkyl and haloalkyl; and $n$ is an integer from 0 to 2.

In a preferred embodiment of this invention $R_1$ is selected from the group consisting of lower alkyl, lower alkenyl, lower fluoroalkyl, lower chloroalkyl, and lower bromoalkyl; $R_2$ is alkyl having up to four carbon atoms; and Y and $n$ are as heretofore described.

The compounds of this invention are unexpectedly useful as fungicides.

The new compounds of this invention can be prepared readily by hydrolyzing a compound of the formula

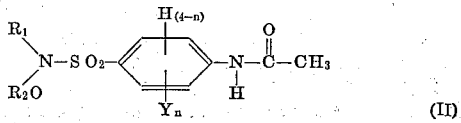

wherein $R_1$, $R_2$, Y and $n$ are as heretofore described, to remove the acetyl group. This reaction can be simply carried out by placing the compound of Formula II into an aqueous acidic medium. The rate of hydrolysis is often increased by heating, and elevated temperatures, up to the boiling point of the reaction mixture, can be desirable. The desired product can be recovered by neutralizing the reaction medium by means of a base such as an alkali metal hydroxide or carbonate to precipitate said product, followed by filtration. The product can then be used as such or can be further purified by standard means known to the art such as washing, recrystallizing and the like.

Compounds of Formula II can be prepared by reacting an acetamidobenzenesulfonyl chloride, having the desired substituents on the ring, with an amine of the formula

wherein $R_1$ and $R_2$ are as hereinabove described, or with the corresponding amine hydrochloride.

This reaction can be effected by combining the acetamidobenzenesulfonyl chloride with the alkoxyamine of Formula III, or the corresponding hydrochloride, in the presence of a base such as a tertiary amine. The reaction can usually be carried out at room temperature, but elevated temperatures can be used when required. The desired product can be recovered by adding water to the reaction mixture and filtering the mixture to isolate the formed precipitate.

Suitable acetamidobenzenesulfonyl chlorides for the purpose of preparing the compounds of the present invention are p-acetamidobenzenesulfonyl chloride, 2-methyl-4-acetamidobenzenesulfonyl chloride, 2-chloro-4-acetamidobenzenesulfonyl chloride, 3-trifluoromethyl-4-acetamidobenzenesulfonyl chloride, 2,6-dimethyl-4-acetamidobenzenesulfonyl chloride, and the like.

Exemplary alkoxyamines suitable for preparing the compounds of this invention are N-methoxy-N-methylamine, N-methoxy-N-ethylamine, N-methoxy-N-isopropylamine, N-ethoxy-N-methylamine, N-methoxy-N-n-butylamine, N-methoxy-N-allylamine, N-ethoxy-N-chloromethylamine, N-methoxy-N-trifluoromethylamine, and the like.

The manner in which the compounds of the present invention can be prepared readily is illustrated in the following examples.

EXAMPLE 1

Preparation of p-acetamidobenzenesulfonyl chloride

Chlorosulfonic acid (290 grams; 2.49 mol) was charged into a 500 ml. glass reaction flask, equipped with a mechanical stirrer, and cooled to about 12° C. Acetanilide (67.5 grams; 0.5 mol) was then slowly added to the flask over a period of about 2 hours while keeping the reaction mixture at about 12 to about 15° C. After the addition was completed the reaction mixture was heated at 60° C., with continuous stirring, for a period of about 2 hours. After this time the reaction mixture was cooled and poured into about 1 kg. of crushed ice resulting in the formation of a solid. The solid was recovered by filtration and was pressed dry to yield p-acetamidobenzenesulfonyl chloride.

EXAMPLE 2

Preparation of $N^1$-methoxy-$N^1$-methyl-$N^4$-acetylsulfanilamide

The p-acetamidobenzenesulfonyl chloride prepared in Example 1 was placed in a glass beaker, and N-methoxy-N-methylamine hydrochloride (49 grams; 0.5 mol) and triethylamine (111 grams; 1.1 mol) was added thereto. An exotherm was observed. The mixture was allowed to stand for a period of three days. After this time water (500 ml.) was added and the mixture boiled on a steam bath for about 15 minutes resulting in the formation of a precipitate. The precipitate was recovered by filtration and was pressed dry to yield $N^1$-methoxy-$N^1$-methyl-$N^4$-acetylsulfanilamide.

EXAMPLE 3

Preparation of $N^1$-methoxy-$N^1$-methylsulfanilamide

The $N^1$ - methoxy - $N^1$ - methyl-$N^4$-acetylsulfanilamide prepared in Example 2 was placed in a glass beaker. Water (300 ml.) and concentrated hydrochloric acid (100 ml.) was added and the mixture was heated to boiling for about 70 minutes. The mixture was then cooled and sodium bicarbonate was slowly added until no further gas evolution was observed. The resulting precipitate was recovered by filtration and was recrystallized to yield $N^1$-methoxy-$N^1$-methylsulfanilamide having a melting point of 113 to 116° C. and having the following elemental analysis as calculated for $C_8H_{12}N_2S_3$:

Calculated (percent): C, 44.4; H, 5.56; N, 13.0; S, 14.8.
Found (percent): C, 44.66; H, 5.80; N, 12.87; S, 14.37.

EXAMPLE 4

Preparation of $N^1$-Methoxy-$N^1$-allyl-$N^4$-acetylsulfanilamide p-Acetamidobenzenesulfonyl chloride (100 grams; 0.5 mol) is placed in a glass beaker, and N - methoxy - N-allylamine (44 grams; 0.5 mol) and triethylamine (50 grams; 0.5 mol) are added thereto. The mixture is then stirred for a period of about 1 hour. After this time water (500 ml.) is added to the beaker and the mixture is boiled on a steam bath for about 30 minutes. The resulting precipitate is recovered by filtration and dried to yield $N^1$-methoxy-$N^1$-allyl-$N^4$-acetylsulfanilamide.

EXAMPLE 5

Preparation of $N^1$-methoxy-$N^1$-allylsulfanilamide $N^1$ - methoxy - $N^1$-allyl - $N^4$ - acetyllsulfanilamide (28.4 grams; 0.1 mol), water (150 ml.) and concentrated hydrochloric acid (50 ml.) are charged into a glass reaction vessel and heated to boiling for about one hour. The mixture is then cooled and sodium bicarbonate is added until no further gas evolution is observed. The resulting precipitate is then recovered by filtration and dried to yield $N^1$-methoxy-$N^1$-allylsulfanilamide.

EXAMPLE 6

Preparation of $N^1$-isopropoxy-$N^1$-chloromethyl-$N^4$-acetylsulfanilamide p-Acetamidobenzenesulfonyl chloride (100 grams; 0.5 mol) is placed in a beaker, and N-isopropoxy-N-chloromethylamine (61 grams; 0.5 mol) and triethylamine (50 grams; 0.5 mol) are added thereto. The mixture is then stirred for a period of about 1 hour. After this time water (500 ml.) is added to the beaker and the mixture is boiled on a steam bath for about 30 minutes. The resulting precipitate is recovered by filtration and dried to yield $N^1$-isopropoxy-$N^1$-chloromethyl-$N^4$-acetylsulfanilamide.

EXAMPLE 7

Preparation of $N^1$-isopropoxy-$N^1$-chloromethyl-sulfanilamide $N^1$ - isopropoxy - $N^1$ - chloromethyl - $N^4$ - acetylsulfanilamide (32 grams; 0.1 mol), water (150 ml.) and concentrated hydrochloric acid (50 ml.) are charged into a glass reaction vessel and heated to boiling for about one hour. The mixture is then cooled and sodium bicarbonate is added until no further gas evolution is observed. The resulting precipitate is then recovered by filtration and dried to yield $N^1$-isopropoxy-$N^1$-chloromethylsulfanilamide.

Other compounds within the scope of the present invention can be prepared in a manner similar to that detailed in the foregoing examples. Presented in the following examples are the essential ingredients required to prepare the indicated named compounds by the procedures heretofore described.

EXAMPLE 8 p-Acetamidobenzenesulfonyl chloride+N - ethoxy - N-n-butylamine+water=$N^1$ - ethoxy - $N^1$ - n - butylsulfanilamide.

EXAMPLE 9

2 - methyl - 4 - acetamidobenzenesulfonyl chloride+N-methoxy - N - methylamine+water=$N^1$ - methoxy - $N^1$-methyl-2-methylsulfanilamide.

EXAMPLE 10

2-chloro - 4 - acetamidobenzenesulfonyl chloride+N-methoxy - N - ethylamine+water=$N^1$-methoxy-$N^1$-ethyl-2-chlorosulfanilamide.

EXAMPLE 11

2,6 - dichloro - 4 - acetamidobenzenesulfonyl chloride+N-methoxy - N - methylamine+water=$N^1$ - methoxy - $N^1$-methyl-2,6-dichlorosulfanilamide.

EXAMPLE 12

3-chloromethyl - 4 - acetamidobenzenesulfonyl chloride +N-methoxy - N - isopropylamine+water=$N^1$-methoxy-$N^1$-isopropyl-3-chloromethylsulfanilamide.

EXAMPLE 13

2 - bromo - 4 - acetamidobenzenesulfonyl chloride+N-methoxy - N - allylamine+water=$N^1$-methoxy-$N^1$-allyl-2-bromosulfanilamide.

EXAMPLE 14 p - Acetamidobenzenesulfonyl chloride+N - methoxy-N-hexylamine+water=$N^1$ - methoxy - $N^1$ - hexylsulfanilamide.

EXAMPLE 15 p - Acetamidobenzenesulfony chloride + N - methoxy-N-decylamine+water=$N^1$ - methoxy - $N^1$ - decylsulfanilamide.

EXAMPLE 16

2 - methyl - 4 - acetamidobenzenesulfonyl chloride+N-ethoxy - N - octylamine+water=$N^1$-ethoxy - $N^1$ - octyl-2-methylsulfailamide.

EXAMPLE 17

2 - decyl - 4 - acetamidobenzenesulfonyl chloride+N-methoxy - N - methylamine+water=$N^1$ - methoxy-$N^1$-methyl-2-decylsulfanilamide.

EXAMPLE 18

2,6 - dimethyl - 4-acetamidobenzenesulfonyl chloride+ N - methoxy - N - trifluoromethylamine+water=$N^1$-methoxy-$N^1$-trifluoromethyl-2,6-dimethylsulfanilamide.

The new compounds of this invention are fungicidal in their ability to kill, inhibit, or inactivate a fungus so that it does not grow. Practically, these compounds can be used to prevent fungi and molds from harming cloth, wood, plants, seeds, fruit, animals, or whatever else they attack. The fungicidal compounds should preferably be applied before the infection has occurred and certainly before it has progressed very far.

For practical use as fungicides, the compounds of this invention are generally incorporated into fungicidal compositions which comprise an inert carrier and a fungicidally toxic amount of such a compound. Such fungicidal compositions, which are usually known in the art as formulations, enable the active compound to be applied conveniently to the site of the fungus infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of fungicides can be dispersed under superatmospheric pressure as aerosols. However, preferred liquid fungicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the fungus infestation. The emulsifiers most commonly used in these concentrates are nonionic or mixtures of nonionic with anionic surface-active agents.

A typical fungicidal composition according to this invention is illustrated by the following example, in which the quantities are in parts by weight.

EXAMPLE 19

Preparation of a dust

Product of Example 3 _____ 10
Powdered talc _____ 90

The above ingredients are mixed in a mechanical grinder-blender and are ground until a homogeneous, free-flowing dust of the desired particle size is obtained. This dust is suitable for direct application to the site of the fungus infestation.

The fungicides of this invention can be applied in any manner recognized by the art. The concentration of the new compounds of this invention in the fungicidal compositions will vary greatly with the type of formulation and the purpose for which it is designed, but generally the fungicidal compositions will comprise from about 0.05 to about 95 percent by weight of the active compounds of this invention. In a preferred embodiment of this invention, the fungicidal compositions will comprise from about 5 to about 75 percent by weight of the active compound. The compositions can also comprise such additional substances as other pesticides, spreaders, adhesives, stickers, fertilizers, activators, synergists, and the like.

The compounds of the present invention are also useful when combined with other fungicides in the fungicidal compositions heretofore described. The other fungicides can comprise from about 5 percent to about 95 percent of the active ingredients in the fungicidal compositions. Use of combinations of these other fungicides with the compounds of the present invention provides fungicidal compositions which are more effective in controlling fungi and often provide results unattainable with separate compositions of the individual fungicides. The other fungicides, with which the compounds of this invention can be used in the fungicidal compositions to control fungi, can include fungicides such as 2-amino-butane, bordeaux mixture, ammonium dimethyl dithiocarbamate, benzoyl trimethyl ammonium bromide, cadmium sulfate, captan, chloranil, copper sulfate, cycloheximide, dichlone, 2,4 - dichloro - 6-(2-chloroanilino)-s-triazine, DDT, dichloran, p-dimethylaminobenzenediazo sodium sulfonate, dinocap, diphenylmercuri. 8-hydroxyquinolinate, dodine, ethylmercuric chloride, ferbam, folpet, gliodin, maneb, metham, mezineb, nabam, pentachloronitrobenzene, PMA, phenylmercuric urea, streptomicin, thiram, zineb, ziram, difolatan, PCNB, and the like.

Such fungicides can also be used in the methods and compositions of this invention in the form of their esters, amides, and other derivatives whenever applicable to the particular parent compound.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoracearum*), cereal leaf rust on wheat (*Puccinia rubigo-vera*), and such common soil fungi as fusarium wilt (*Fusarium oxysporum*), the seed rot fungus (*Phythium debaranum*), and the sheath and culm blight (*Rhizoctonia solani*). The new compounds of this invention can also be employed as industrial fungicides to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation of certain fungi, a pound or more of active compound per acre may be required to control a heavy infestation of a hardy species of fungus.

The fungicidal utility of the novel sulfanilamides of this invention was demonstrated in an experiment carried out for the control of fungi. In this experiment the test compound $N^1$-methoxy-$N^1$-methylsulfanilamide was formulated as an aqueous emulsion of an acetone solution to a concentration of 1000 p.p.m. of active compound. Susceptible species of tomato plants, growing in soil in individual plastic pots were sprayed with the test formulation when grown to a height of approximately 6 to 8 inches. After the spray had dried thoroughly the plants were sprayed with a suspension of spores of tomato late blight fungus, *Phytophthora infestans*. After two days to one week, disease symptoms were observed and rated by comparison to untreated controls. The test compound $N^1$-methoxy-$N^1$-methylsulfanilamide gave 48.3 percent control as a protectant against late blight of tomato.

The compounds of the present invention are also useful for preparing compounds of the formula

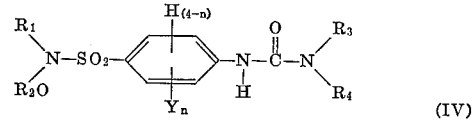

(IV)

wherein $R_1$ is selected from the group consisting of lower alkyl, lower alkenyl, and lower haloalkyl; $R_2$ is lower alkyl; Y is selected from the group consisting of halogen, lower alkyl and lower haloalkyl; $n$ is an integer from 0 to 2; $R_3$ is selected from the group consisting of hydrogen, lower alkyl, lower alkenyl and lower haloalkyl; and $R_4$ is selected from the group consisting of lower alkyl, lower alkenyl and lower haloalkyl.

The compounds of Formula IV are unexpectedly effective as pesticides, particularly as herbicides.

Exemplary of these compounds are:

1-[4'-(N-methoxy-N-methylsulfamoyl)-phenyl]-3-methylurea

1-[2'-methyl-4$_2$-(N-methoxy-N-methylsulfamoyl)-phenyl]-3-methylurea

1-[4'-(N-methoxy-N-methylsulfamoyl)-phenyl]-3,3-dimethylurea

1-[4'-(N-methoxy-N-allylsulfamoyl)-phenyl]-3-methylurea

1-[3'-chloro-4'-(N-methoxy-N-methylsulfamoyl)-phenyl]-3-methylurea

1-[4'-(N-methoxy-N-methylsulfamoyl)-phenyl]-3-allylurea

1-[4′-(N-methoxy-N-methylsulfamoyl)-phenyl]-3-methyl-3-trifluoromethylurea

1-[4′-(N-methoxy-N-methylsulfamoyl)-phenyl]-3-methyl-3-isopropylurea

1-[4′-(N-methoxy-N-allylsulfamoyl)-phenyl]-3-methyl-3-chloromethylurea

1-[4′-(N-methoxy-N-isopropylsulfamoyl)-phenyl]-3,3-di-n-butylurea

1-[2′,6′-dichloro-4-(N-methoxy-N-methylsulfamoyl)-phenyl]-3-methylurea

1-[4′-(N-isopropoxy-N-chloromethylsulfamoyl)-phenyl]-3,3-dimethylurea

1-[4′-(N-ethoxy-N-methylsulfamoyl)-phenyl]-3-ethyl-3-allylurea and the like.

The urea compounds of Formula IV can be prepared by reacting a sulfanilamide of Formula I with a carbamoyl halide of the formula

wherein X is halogen, preferably chlorine, and $R_3$ and $R_4$ are as heretofore described. This reaction can be effected by dissolving the sulfanilamide in a suitable inert organic solvent and slowly adding the carbamoyl halide thereto. This reaction can be carried out at room temperatures, preferably in the presence of a base, by stirring the reaction mixture for from about ½ to about 4 hours. The desired product often forms as a precipitate and can then be recovered by filtration. If the desired product is soluble in the organic solvent employed it can be recovered by evaporating the solvent or by adding a diluent thereto to precipitate the product. The product can then be used as such or can be further purified by procedures well known to the art such as washing, recrystallizing, triturating and the like.

The compounds of Formula IV wherein the $R_3$ substituent is hydrogen can also be prepared by reacting a sulfanilamide of Formula I with an isocyanate of the formula $$O=C=N-R_4 \quad (VI)$$

wherein $R_4$ is as hereinabove described. This reaction can be carried out by dissolving the sulfanilamide in a suitable inert organic solvent and slowly adding the isocyanate thereto. In many instances the reaction is exothermic and cooling of the reaction mixture may be necessary. In some instances the reaction is slow and heating may be required. The product can be recovered as a precipitate or by other conventional methods in the art.

Suitable carbamoyl halides for preparing the compounds of Formula IV are methylcarbamoyl chloride, dimethylcarbamoyl chloride, diethylcarbamoyl bromide, diisopropylcarbamoyl chloride, dibutylcarbamoyl chloride, allyl-tert-butylcarbamoyl chloride, and the like.

Suitable isocyanates are methyl isocyanate, ethyl isocyanate, n-propyl isocyanate, isopropyl isocyanate, n-butyl isocyanate, sec-butyl isocyanate, t-butyl isocyanate, allyl isocyanate, 2-chloroethyl isocyanate, trifluoromethyl isocyanate, and the like.

The compounds of Formula IV can also be prepared from the sulfanilamide compounds of Formula I by a two step process wherein the sulfanilamide is first reacted with phosgene to form the isocyanate as an intermediate, and then reacting the isocyanate with an amine of the formula

wherein $R_3$ and $R_4$ are as heretofore described, to form the desired urea.

This two step reaction can be readily carried out by adding a solution of the sulfanilamide, in a suitable inert organic solvent, to a solution of phosgene in an inert organic solvent at lower temperatures such as below about 20° C. The intermediate isocyanate can be recovered by evaporating the solvent if it remains in solution, or by filtration if it forms as a precipitate. The isocyanate intermediate can then be used as such or can be further purified by washing, recrystallizing or the like.

The intermediate isocyanate is then dissolved in an organic solvent, such as benzene, and the amine of Formula VII is added thereto. The reaction mixture is stirred for a period of from about ½ to 4 hours to insure the completion of the reaction. The desired product, which usually forms as a precipitate, can then be recovered by filtration and used as such or can be further purified by washing, triturating, recrystallizing and other common methods well known to the art.

Exemplary suitable amines for preparing the described urea compounds by the above method are methylamine, ethylamine, n-propylamine, isopropylamine, n-butylamine, N,N-dimethylamine, N,N-diethylamine, N-methyl-N-ethylamine, N-methyl-N-trifluoromethylamine, N-methyl-N-allylamine, N-methyl-N-isopropylamine and the like.

The manner in which the urea compounds of Formula IV can be prepared readily is illustrated in the following examples:

EXAMPLE 20

Preparation of 1-[4′-(N-methoxy-N-methylsulfamoyl)-phenyl]-3,3-dimethylurea

A solution of $N^1$-methoxy-$N^1$-methylsulfanilamide (15 grams; 0.07 mol) in chlorobenzene (100 ml.) was slowly added with stirring to a solution of phosgene (14 grams; 0.14 mol) in chlorobenzene (50 ml.). A precipitate was formed during the addition. Additional phosgene was added to the reaction mixture by passing the gas through the mixture until a weight increase of 10 grams was observed. The reaction mixture was then heated at 80° C. with stirring, for a period of about 4 hours. The precipitate which formed earlier redissolved and considerable gas evolution was observed. The reaction mixture was then purged with nitrogen for about 30 minutes, and was evaporated to yield a crude dark solid.

The crude solid was dissolved in benzene (100 ml.) and the benzene solution decanted from the remaining insolubles. The solution was placed in a flask and was cooled in an ice bath. Dimethylamine (50 grams) was then added to the flask with stirring resulting in the formation of a precipitate. Stirring was continued for a period of about 1 hour. After this time the precipitate was recovered by filtration, was washed with benzene and hexane, and was then recrystallized from about 500 ml. of benzene. The crystals were washed again with benzene and then with hexane and were dried to yield 1-[4′-(N-methoxy - N - methylsulfamoyl) - phenyl] - 3,3 - dimethylurea having a melting point 154 to 156° C. and having the following elemental analysis as calculated for $C_{11}H_{17}N_3O_4S$:

Theoretical (percent): C, 46.0; H, 5.9; N, 14.6; S, 11.1.
Found (percent): C, 42.25; H, 6.00; N, 14.62; S, 11.11.

EXAMPLE 21

Preparation of 1-[4′-(N-methoxy-N-methylsulfamoyl)-phenyl]-3-methylurea

A solution of $N^1$-methoxy-$N^1$-methylsulfanilamide (21 grams; 0.1 mol) in benzene (150 ml.) is charged into a glass reaction vessel equipped with mechanical stirrer and cooling means. The solution is cooled to about 10° C. and methyl isocyanate (6 grams; 0.1 mol) is slowly added thereto. Stirring is continued after the addition is completed for a period of about 2 hours. The resulting precipitate is then recovered by filtration and is washed, recrystallized and dried to yield 1 - [4' - (N - methoxy-N-methylsulfamoyl)-phenyl]-3-methylurea.

EXAMPLE 22

Preparation of 1-[2'-methyl-4'-(N-methoxy-N-methylsulfamoyl)-phenyl]-3,3-dimethylurea A solution of $N^1$-methoxy-$N^1$-methyl-2-methylsulfanilamide (23 grams; 0.1 mol) in chlorobenzene (150 ml.) is slowly added, with stirring, to a solution of phosgene (20 grams; 0.2 mol) in chlorobenzene (75 ml.). Additional phosgene is added to the reaction mixture by passing the gas through the mixture until a weight increase of about 10 grams is observed. After the addition is completed the reaction mixture is heated to about 75° C. with stirring for a period of about 4 hours. After this time the reaction mixture is purged with nitrogen for about 30 minutes. The solvent is then evaporated from the mixture to yield a solid product.

The solid product is dissolved in benzene (100 ml.) and placed in a glass reaction vessel equipped with cooling and stirring means. The solution is cooled to about 0° C. and dimethylamine (75 grams) is added thereto. Stirring is continued for a period of about 1 hour. The resulting precipitate is recovered by filtration, is washed and recrystallized to yield 1 - [2' - methyl - 4' - (N-methoxy-N-methylsulfamoyl)-phenyl]-3,3-dimethylurea.

EXAMPLE 23

Preparaiton of 1-[3-chloro-4-(N-methoxy-N-methylsulfamoyl)-phenyl]-3-methyl-3-allylurea A solution of $N^1$-methoxy-$N^1$-methyl-3-chlorosulfanilamide (25 grams; 0.1 mol) in chlorobenzene (150 ml.) is slowly added, with stirring, to a solution of phosgene (20 grams; 0.2 mol) in chlorobenzene (75 ml.). Additional phosgene is added to the reaction mixture by passing the gas through the mixture until a weight increase of about 10 grams is observed. After the addition is completed the reaction mixture is heated to about 75° C. for a period of about 4 hours. After this time the reaction mixture is purged with nitrogen for about 30 minutes. The solvent is then evaporated from the reaction mixture to yield a solid product.

The solid product is dissolved in benzene (100 ml.) and placed in a glass reaction vessel equipped with cooling and stirring means. The solution is cooled to about 5° C. and N-methyl-N-allylamine (50 grams) is added thereto. Stirring is continued for a period of about 1 hour. The resulting precipitate is recovered by filtration, is washed and recrystallized to yield 1-[3-chloro-4-(N-methoxy - N - methylsulfamoyl) - phenyl] - 3 - methyl-3-allylurea.

Additional compounds of Formula IV can be prepared in a manner similar to that detailed in the foregoing examples. Presented in the following examples are the essential ingredients required to prepare the indicated named compounds by the procedures heretofore described.

EXAMPLE 24

$N^1$ - ethoxy - $N^1$ - methylsulfanilamide+phosgene+dimethylamine=1 - [4 - (N - ethoxy - N - methylsulfamoyl)-phenyl]-3,3-dimethylurea.

EXAMPLE 25

$N^1$ - methoxy - $N^1$ - methylsulfanilamide+phosgene +N - methyl - N - trichloromethylamine=1 - [ 4 - (N-methoxy - N - methylsulfamoyl) - phenyl] - 3 - methyl-3-trichloromethylurea.

EXAMPLE 26

$N^1$ - methoxy - $N^1$ - isopropylsulfanilamide+chloromethyl isocyanate=1 - [4 - (N - methoxy - N - isopropylsulfamoyl)-phenyl]-3-chloromethylurea.

EXAMPLE 27

$N^1$ - methoxy - $N^1$ - ethyl - 2 - methyl - 6 - chlorosulfanilamide+phosgene+dimethylamine=1 - [3 - methyl - 4 - (N - methoxy - N - ethylsulfamoyl) - 5 - chlorophenyl]-3,3-dimethylurea.

EXAMPLE 28

$N^1$ - methoxy - $N^1$ - methylsulfanilamide+phosgene+ N - n - butylamine=1 - [4 - (N - methoxy - N - methylsulfamoyl)-phenyl]-3-n-butylurea.

The herbicidal activity of the urea compound of Formula IV can be illustrated by many of the established testing techniques known to the art, such as pre- and post-emergence testing.

The herbicidal activity of these compounds was demonstarted by experiments carried out for the pre-emergence control of crabgrass, curled dock, mustard weed, velvet leaf and wild oats. In these experiments small plastic greenhouse pots filled with dry soil were seeded with seeds of the aforementioned weeds. Twenty four hours or less after seeding the pots were sprayed with water until the soil was wet and 1-[4'-(N-methoxy-N-methylsulfamoyl)-phenyl]-3,3-dimethylurea formulated as an aqueous emulsion of an acetone solution containing emulsifiers was sprayed at the indicated rates on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 0 to 10, as follows: 0=no injury, 1, 2= slight injury, 3, 4=moderate injury, 5, 6=moderately severe injury, 7, 8, 9=severe injury and 10=death. The herbicidal effectiveness is demonstrated by the data in Table 1.

TABLE 1

| Weed species | Application rate of test compound, lbs./acre | Injury rating |
| --- | --- | --- |
| Crabgrass | 8 | 10 |
| Do | 4 | 8 |
| Do | 2 | 8 |
| Curled dock | 8 | 9 |
| Do | 4 | 9 |
| Do | 2 | 8 |
| Mustard | 8 | 10 |
| Do | 4 | 10 |
| Do | 2 | 9 |
| Velvet leaf | 8 | 10 |
| Do | 4 | 9 |
| Do | 2 | 7 |
| Wild oast | 8 | 10 |
| Do | 4 | 9 |
| Do | 2 | 9 |

The herbicidal activity of the urea compounds of Formula IV was also demonstrated by experiments carried out for the post emergence control of curled dock, foxtail, mustard, metricaria, pigweed and velvet leaf. In these experiments 1 - [4' - (N - methoxy - N - methylsulfamoyl)phenyl] - 3,3 - dimethylurea was formulated as an aqueous emulsion and sprayed at the indicated rate on the foilage of curled dock, foxtail, mustard, metricaria, pigweed and velvet leaf plants that had attained a prescribed size. After spraying the plants were placed in a greenhouse and watered daily or more frequently. Water was not applied to the foliage of the treated plants. The severity of the injury was determined 10 to 15 days after treatment and was was rated on the scale of from 0 to 10 heretofore described. The effectiveness of these compounds are demonstrated by the following data in Table 2.

TABLE 2

| Weed species | Application rate of test compound, lbs./acre | Injury rating |
|---|---|---|
| Curled Dock | 8 | 9 |
| Do | 4 | 10 |
| Do | 2 | 10 |
| Foxtail | 8 | 9 |
| Do | 4 | 9 |
| Do | 2 | 10 |
| Mustard | 8 | 10 |
| Do | 4 | 10 |
| Do | 2 | 10 |
| Matricaria | 8 | 10 |
| Do | 4 | 10 |
| Do | 2 | 9 |
| Pigweed | 8 | 10 |
| Do | 4 | 10 |
| Do | 2 | 10 |
| Velvet Leaf | 8 | 10 |
| Do | 4 | 10 |
| Do | 2 | 10 |

I claim:
1. A compound of the formula

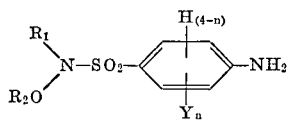

wherein $R_1$ is selected from the group consisting of lower alkyl, allyl and lower haloalkyl; $R_2$ is lower alkyl; Y is selected from the group consisting of halogen, lower alkyl and lower haloalkyl; and $n$ is an integer from 0 to 2 provided that when $R_1$ is lower alkyl, Y is halogen or lower haloalkyl and $n$ is 1 or 2.

2. The compound of claim 1, $N^1$-methoxy-$N^1$-allylsulfanilamide.

3. The compound of claim 1, $N^1$-methoxy-$N^1$-methyl-2,6-dichlorosulfanilamide.

4. The compound of claim 1, $N^1$-methoxy-$N^1$-[methyl]allyl-2-bromosulfanilamide.

5. A compound of claim 1, $N^1$-isopropoxy-$N^1$-chloromethylsulfanilamide.

6. A compound of claim 1, $N^1$-methoxy-$N^1$-ethyl-2-chlorosulfanilamide.

References Cited

UNITED STATES PATENTS 2,371,254  3/1945  Nathan _____ 260—397.7

OTHER REFERENCES

Goldfarb: JACS: vol. 67, pp. 1852–53 (1945).

HENRY R. JILES, Primary Examiner

S. D. WINTERS, Assistant Examiner

U.S. Cl. X.R.

71—103; 260—453, 543, 583, 544; 424—228